United States Patent
Cao et al.

(10) Patent No.: US 10,762,439 B2
(45) Date of Patent: Sep. 1, 2020

(54) EVENT CLUSTERING AND CLASSIFICATION WITH DOCUMENT EMBEDDING

(71) Applicant: International Business Machines Corporation, Armonk, NY (US)

(72) Inventors: Feng Cao, Shanghai (CN); Boliang Chen, Shanghai (CN); Zheng Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 15/219,401

(22) Filed: Jul. 26, 2016

(65) Prior Publication Data

US 2018/0032897 A1    Feb. 1, 2018

(51) Int. Cl.
   *G06N 20/00* (2019.01)
   *G06F 16/35* (2019.01)
   *G06N 20/10* (2019.01)
   *G06N 5/02* (2006.01)

(52) U.S. Cl.
   CPC ............ *G06N 20/00* (2019.01); *G06F 16/35* (2019.01); *G06N 5/022* (2013.01); *G06N 20/10* (2019.01)

(58) Field of Classification Search
   CPC .. G06F 17/271; G06F 17/277; G06F 17/2785; G06F 16/35; G06F 16/93; G06N 20/00; G06N 3/08
   See application file for complete search history.

(56) References Cited

U.S. PATENT DOCUMENTS

| | | | |
|---|---|---|---|
| 6,038,561 A | 3/2000 | Snyder et al. | |
| 6,654,739 B1* | 11/2003 | Apte | G06F 16/355 |
| 8,892,488 B2 | 11/2014 | Qi et al. | |
| 2006/0242140 A1* | 10/2006 | Wnek | G06F 16/355 |
| 2015/0324469 A1* | 11/2015 | Keyngnaert | G06F 16/33 707/706 |

(Continued)

FOREIGN PATENT DOCUMENTS

| | | |
|---|---|---|
| EP | 2624149 A2 | 8/2013 |
| WO | 2015116909 A1 | 8/2015 |

OTHER PUBLICATIONS

Huang C., Qiu X., Huang X, Text Classification with Document Embeddings, In: Sun M., Liu Y., Zhao J. (eds) Chinese Computational Linguistics and Natural Language Processing Based on Naturally Annotated Big Data, NLP-NABD 2014, CCL 2014, Lecture Notes in Computer Science, vol. 8801, 2014. (Year: 2014).*

(Continued)

*Primary Examiner* — Kamran Afshar
*Assistant Examiner* — Marshall L Werner
(74) *Attorney, Agent, or Firm* — Scully, Scott, Murphy & Presser, P.C.; Joseph Petrokaitis

(57) ABSTRACT

Embedding representation for a document is generated based on clustering words in the document. Representative clusters are selected and a weighted sum of the embeddings of the words in the selected clusters is determined as a document embedding. Documents are labeled based on document embeddings. A machine learning algorithm is trained using the documents. The machine learning algorithm predicts a label of a given document based on the given document's document embedding.

20 Claims, 5 Drawing Sheets

(56) References Cited

U.S. PATENT DOCUMENTS

| | | | | |
|---|---|---|---|---|
| 2015/0331908 A1* | 11/2015 | Duffy | ................ | G06F 16/3328 707/765 |
| 2017/0024456 A1* | 1/2017 | Lee | ........................ | H04L 51/12 |
| 2018/0189614 A1* | 7/2018 | Chen | ................ | G06F 17/2247 |

OTHER PUBLICATIONS

Staff, Chris, Bookmark Category Web Page Classification Using Four Indexing and Clustering Approaches, W. Nejdl et al. (Eds.): AH 2008, LNCS 5149, pp. 345-348, 2008. (Year: 2008).*

Wang, Peng & Xu, Bo & Xu, Jiaming & Tian, Guanhua & Liu, Cheng-Lin & Hao, Hongwei, Semantic expansion using word embedding clustering and convolutional neural network for improving short text classification, Neurocomputing 174, Jan. 2016. (Year: 2016).*

De Boom et al., Representation learning for very short texts using weighted word embedding aggregation, Pattern Recognition Letters, pp. 1-8, Jul. 2016. (Year: 2016).*

Choi, Sang Hee, Document Clustering Using Reference Titles, Journal of the Korean Society for information Management 27(2): 241-252, Jun. 2010. (Year: 2010).*

Schnabel et al., Evaluation methods for unsupervised word embeddings, EMNLP 2015, 2015. (Year: 2015).*

Kusner et al., From Word Embeddings to Document Distances, Proceedings of the 32nd International Conference on Machine Learning, Lille, France, 2015. JMLR: W&CP vol. 37, 2015. (Year: 2015).*

Kenter et al., Short Text Similarity with Word Embeddings, Proceedings of the 24th ACM International on Conference on Information and Knowledge Management pp. 1411-1420, Oct. 2015. (Year: 2015).*

Masry et al., Cluster validity measures dynamic clustering algorithms, Journal of Engineering and Applied Sciences 10(9):4009-4012 • May 2015. (Year: 2015).*

Liu, Y., et al., "Topical Word Embeddings", AAAI'15 Proceedings of the Twenty-Ninth AAAI Conference on Artificial Intelligence, Jan. 2015, 7 pages.

Kalogeratos, A., et al., "Text document clustering using global term context vectors", Knowledge Information Systems, Jun. 2012, pp. 455-474, vol. 31, No. 3.

Vinokourov, A., et al., "Inferring a Semantic Representation of Text via Cross-Language Correlation Analysis", Advances in Neural Information Processing Systems 15, NIPS 2002, Dec. 9-14, 2002, 8 pages.

Nasir, J.A., et al., "Semantic smoothing for text clustering", Knowledge-Based Systems, Dec. 2013, pp. 216-229, vol. 54.

Clinchant, S., et al., "Aggregating Continuous Word Embeddings for Information Retrieval", Proceedings of the Workshop on Continuous Vector Space Models and their Compositionality, Aug. 2013, pp. 100-109.

Le, Q. et al., "Distributed Representations of Sentences and Documents" Proceedings of the 31st International Conference on Machine Learning, Jun. 2014, 9 pages.

Halkidi, M., et al., "Clustering Validity Assessment: Finding the optimal partitioning of a data set", ICDM, Feb. 2001, 9 pages.

Mikolov, T., et al., "Efficient Estimation of Word Representations in Vector Space", Cornell University Library, Sep. 2013, 12 pages.

* cited by examiner

EVENT CLUSTERING AND CLASSIFICATION WITH DOCUMENT EMBEDDING

FIELD

The present application relates generally to computers and computer applications, and more particularly to cognitive computing and analytics.

BACKGROUND

Clustering or classifying text is a challenging problem as it is a fine-grained task, for example, in domains such as finance, where texts may include many domain-specific words, have high frequency of occurrences and term frequency-inverse document frequency (tf-idf) values. Traditional representation of documents, such as bag-of-word (BOW) based on word count or tf-idf has bias on frequent words, and the real semantic of a document could be easily buried. For example, a document may be represented by bag-of-words vector, where each dimension denotes a word feature and value is the frequency or tf-idf. Such representation is sparse and high dimensional in which the dimensionality is equal to the size of vocabulary, and word features are completely independent from one another. Other embedding representation for documents does not capture the semantic of a document accurately and loses much information of the document during the machine learning or training process.

BRIEF SUMMARY

A method and system of training a machine to learn to predict a label for data are disclosed. The method, in one aspect, may include receiving a document. The method may also include creating clusters of words in the document based on cosine similarity of word embeddings of words in the document. The method may further include, responsive to determining that the document has a title, ranking the clusters based on cosine similarity of word embeddings of words in a cluster and word embeddings of words in the title. The method may also include, responsive to determining that the document has no title, ranking the clusters based on compactness of a cluster indicating how closely related the words in the cluster are and a semantic distance of the cluster from other clusters. The method may further include selecting a top-k number of the ranked clusters. The method may also include determining a document embedding as a weighted sum of word embeddings of words in the top-k number of ranked clusters, wherein the receiving, the creating, the ranking, the selecting, and the determining of the document embedding are performed for multiple documents. The method may further include labeling each of the multiple documents. The method may also include training a machine learning algorithm based on the multiple documents that are labeled, wherein the training comprises separating the multiple documents as a training set and a test set, and generating a machine learning model that predicts a label for a given document based on the training set and the test set.

A system of training a machine to learn to predict a label for data, in one aspect, may include a storage device and a hardware processor coupled to the storage device. The hardware processor may be operable to receive a document. The hardware processor may be further operable to create clusters of words in the document based on cosine similarity of word embeddings of words in the document. The hardware processor may be further operable to, responsive to determining that the document has a title, rank the clusters based on cosine similarity of word embeddings of words in a cluster and word embeddings of words in the title. The hardware processor may be further operable to, responsive to determining that the document has no title, rank the clusters based on compactness of a cluster indicating how closely related the words in the cluster are and a semantic distance of the cluster from other clusters. The hardware processor may be further operable to select a top-k number of the ranked clusters. The hardware processor may be further operable to determine a document embedding as a weighted sum of word embeddings of words in the top-k number of ranked clusters, wherein the hardware processor determines document embeddings for multiple documents and store the multiple documents with document embeddings in the storage device. The hardware processor may be further operable to label each of the multiple documents. The hardware processor may be further operable to generate a machine learning model that predicts a label for a given document by training the machine learning model based on the multiple documents separated into the training set and the test set.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, and computer program product may be provided that implement a framework to learn embedding representation for a document, and the embedding is able to capture an outstanding aspect of that document's semantics. In one aspect, words in a single document may be clustered, and the embedding representation may be inferred based on top-K most representative clusters. Based on such representation, clustering, classification or other text-related processes may be performed to understand the texts, for example, determine category or keywords associated with a corpus of text such as news or another document.

The embedding representation of the present disclosure in one embodiment is a low dimensional and a real-valued vector. An example includes x=[0.1, 0.08, . . . , −0.23, . . . ]. The embedding representation may be dense. With embedding representation, semantically similar documents have similar embeddings. The embedding representation can be considered different from the one-hot representation in that the one-hot representation is high dimensional, sparse. Semantically similar documents may not have similar one-hot representations. One hot representation represents a word as a high dimensional vector, whose dimension is same as the size of the vocabulary, and only the position that corresponds to the word is set to 1, other values are 0. An example of one-hot representation includes, y=[0, 0, 1, . . . , 0, 0, . . . ].

In one aspect, to determine the embedding representation for a document, the system and/or method of the present disclosure may cluster the words within a document, select k (e.g., 1, 2) most representative clusters from the result clusters, and use weighted average embeddings of the words in the selected clusters as the embedding representation for that document. In one embodiment, the embedding representation is low-dimensional and dense, and semantically similar texts have similar embeddings, enabling efficient and effective clustering, classification and other text-related tasks on those documents.

Figure 1:
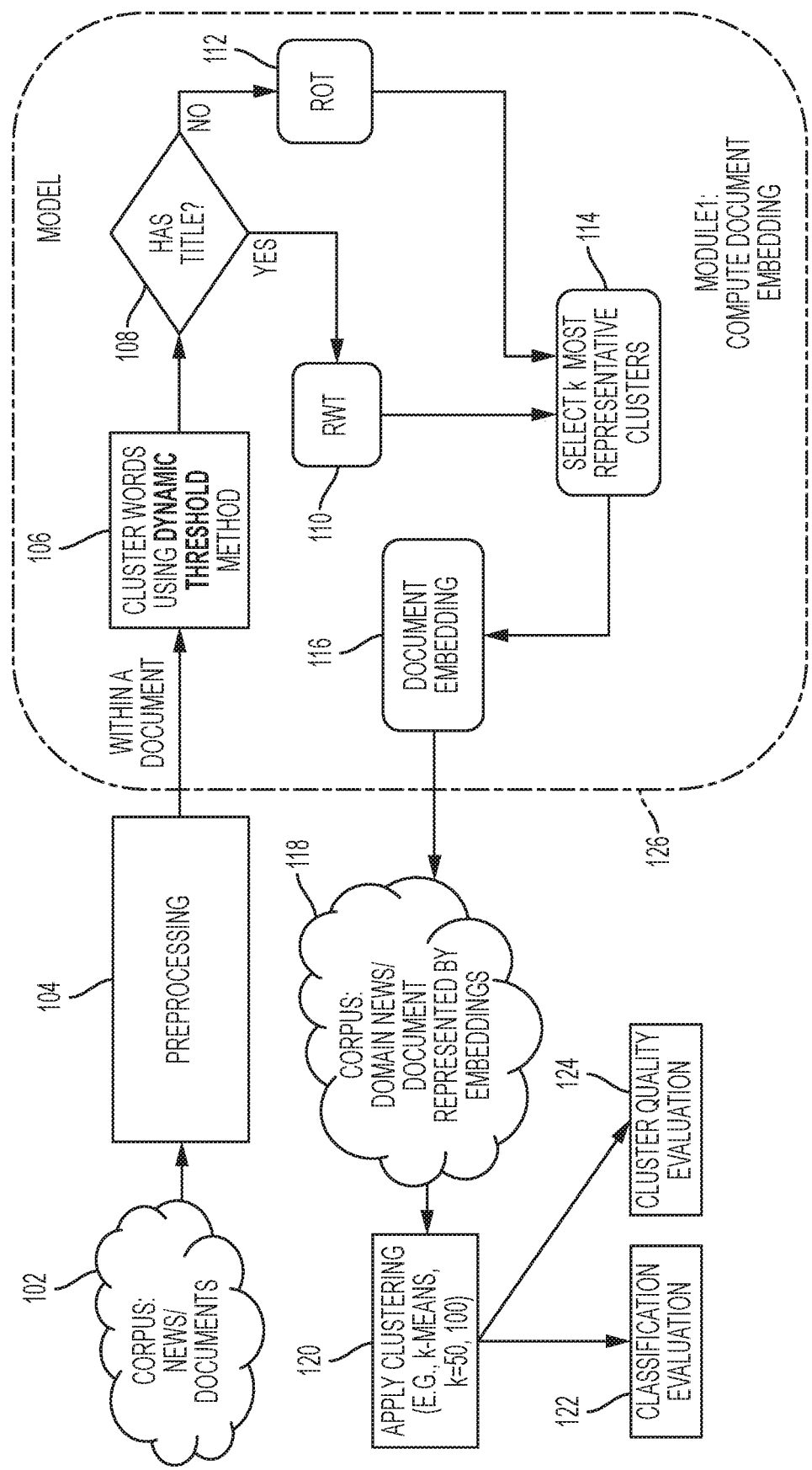
FIG. 1 is a diagram illustrating system architecture that generates document embedding in one embodiment of the present disclosure.

FIG. 1 is a diagram illustrating system architecture that generates document embedding in one embodiment of the present disclosure. A word is represented by a vector, called word embedding, and a cluster is represented by the sum embeddings of its words. The word embeddings are trained by the skip-gram model using news documents in one embodiment of the present disclosure.

Components shown in FIG. 1 run or execute on one or more hardware processors. To compute the embedding for a document, the document may be received, for example, from a computer network 102. The document may be preprocessed at 104. Examples of preprocessing may include word segmentation, training of word embedding, and filtering out stop words.

At 106, the words in the document are clustered, for example, using an approach called dynamic threshold method (DT). The dynamic threshold method takes as input a list of words, L={w1, w2, . . . , wn}, and outputs a cluster result Ω={c1, c2, . . . , cm}. This method or algorithm places a given word wi into an existing cluster or assigns to a new cluster. For example, given any word w, suppose there are n clusters already, the algorithm finds the cluster C which is most similar to w, for example, determined by the cosine similarity, Sim(C, w). If Sim(C, w)>t, w is placed in cluster C, otherwise w creates a new cluster.

In one embodiment, threshold t is computed by:

$$t=1/(\exp^{n-\beta}+\delta) \text{ or } t=\alpha(n-\beta)+\delta$$

where n is the number of current clusters, β and δ are two parameters, which are predefined.

The DT algorithm is summarized as follows:
For any word $w_i$, the algorithm puts the word into an existing cluster or assigns to a new cluster by performing the following process:
(1) Find the cluster c whose cosine similarity with $w_i$ is maximal among all current clusters, i.e., c=argmax$_C$sim($w_i$, c);
(2) If sim($w_i$, c)>threshold, add $w_i$ to the cluster c, and update c's embedding. For example, the c's embedding is the sum embeddings of previous c's embedding and the word wi's embedding. For example, c's embedding is [0.1, 0, 0.2] and wi's embedding is [0.05, 0, 0.11], after adding wi to cluster c, the c's embedding is updated to [0.15, 0, 0.31];
(3) Otherwise, create a new cluster that only contains $w_i$;
(4) Repeat step (1) to step (3) until all words are processed in the document.

The embedding of a cluster is the sum of its words' embeddings. For example, If a cluster c contains word w1, w2 and w3, and the word embeddings are respectively [0.1, 0.2, 0.05], [−0.11, 0, 0.12] and [−0.2, 0.1, 0.15], then the cluster c is represented by the sum embeddings of w1, w2 and w3, that is [−0.21, 0.3, 0.32].

Figure 3:
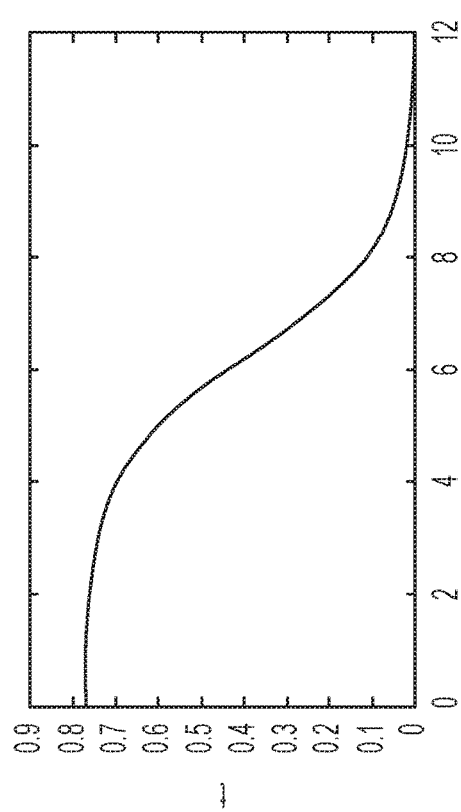
FIG. 3 illustrates the variant of sigmoid function in one embodiment of the present disclosure.
Figure 4:
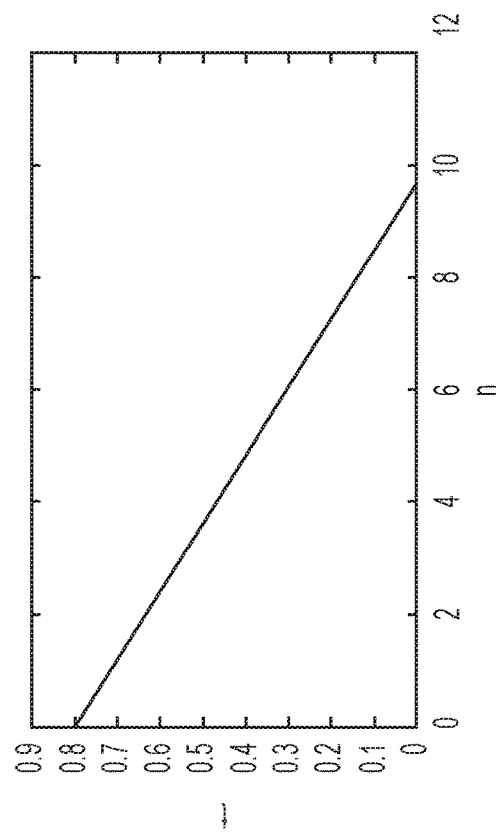
FIG. 4 illustrates the linear function in one embodiment of the present disclosure.

In some embodiments, the threshold t is dynamic and may depend on the current number of clusters. The threshold may be computed by (1) a variant of sigmoid function: t=1/(exp$^{n-\beta}$+δ). The threshold may be also computed by (2) a linear function: t=α(n−β)+δ. In the above threshold computation, n represents the number of clusters, and α, β, δ represent parameters that are pre-defined. FIG. 3 illustrates the variant of sigmoid function in one embodiment of the present disclosure. The variant of sigmoid function shown in FIG. 3 represents t=1/(exp (n−6)+1.3). FIG. 4 illustrates the linear function in one embodiment of the present disclosure. The linear function shown in FIG. 4 represents t=−0.083*(n−6)+0.3.

The clustering at 106 clusters a document, for example, as Ω=(c1, c2, . . . , cm). The clustering groups similar words into a same cluster, so a cluster may be treated as an aspect meaning of that document. Based on the observation, the system and/or method of the present disclosure may determine which clusters are most representative and use those clusters to infer that document's embedding. In some embodiments, two cases may be considered: 1) a document has explicit title information (Representation with Title, abbreviated to RWT); and 2) a document has no title (Representation withOut Title, abbreviated to ROT).

Based on the cluster result of a document determined at 106, the following method or process may rank clusters and select k most representative ones to compute the embedding for that document.

RWT method (rank with title): if the document has title, the clusters are ranked based on their cosine similarities with the title. A title usually summarizes the document, and title t may be preprocessed to filter stop words. The title is also represented by the sum embeddings of its words. Referring to 108, if the document has title, an RWT method is performed at 110. RWT method may be performed, for example, if a document has explicit title information. The title may be compared with every cluster $c_i$, and the top-k (e.g., k=1, 2) most similar clusters may be selected as the representative clusters in terms of semantic. k may be pre-defined and configurable.

The following algorithm may be implemented to compute embedding of representation with title.
(1) title is represented by summing words' embeddings of the words in the title:

$$E(t)=\Sigma_{i=1}^{l}E(w_i)$$

Where, l is the length of title, that is, the number of words in the title t,
Wi represents the i-th word in the title t;
(2) compute the similarity (e.g., cosine similarity) between embeddings of each cluster $c_i$ and title t;
(3) select top-k clusters that are most similar to t, and compute the document embedding as:

$$E(d) = \sum_{i=1}^{n} \mu_i E(w_i), \text{ and } \mu_i = \frac{N(w_i)}{\sum_{j=1}^{n} n(w_j)} \qquad (1)$$

Where n is the number of distinct words in the top-k clusters, $\mu_i$ is the weight of word $w_i$,
N is a function that returns the number of a distinct word occurring in the selected top-k clusters.
For instance, N(wi) represents the number of times word wi occurring in the top-k clusters.

At 114, top-k clusters are selected as the representatives, and the weighted average embedding of their words are used as the representation for that document, for instance, as described in step (3) above, for a document with title.

If at 108, it is determined that the document has no title, ROT method is performed at 112. ROT method (rank without title): If there is no title, the clusters are ranked based on the structure information, which includes compactness metric and semantic bias metric. Thus, the goodness of a cluster may be measured according to the two criteria: (1) compactness and semantic bias (also referred to as semantic typicality). Compactness measures how closely related the words in a cluster are. Variance may be used to evaluate a cluster's compactness which is evaluated by var ($c_i$). For instance, for a cluster $c_i$, compactness is measured by the cluster variance. For example, lower variance indicates better compactness.

Figure 5:
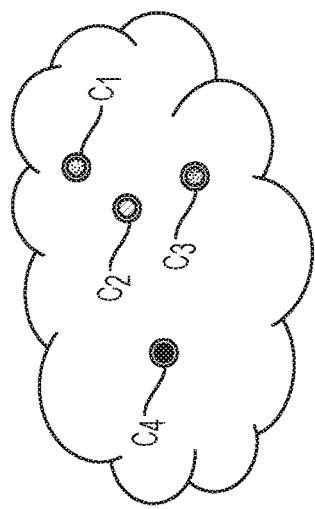
FIG. 5 shows an example of clusters and their distances.

Semantic bias or typicality measures how typical a cluster is in terms of semantic. For instance, a cluster may be far away from all other clusters, e.g., like $c_4$ shown in FIG. 5. FIG. 5 shows an example of clusters and their distances. A cluster may be located in the center position among a community, e.g., like c2 shown in FIG. 5. If many clusters are closely allocated, they compose a community. Closeness may be defined based on a threshold distance. Semantic bias is measured by the sum of distances between that cluster (center $v_i$) and other clusters:

$$sd(c_i) = \sum_{j \neq i}^{m} \text{Euclid}(v_i, v_j), \text{ where } v_i, v_j \text{ is the cluster center.}$$

For example, for a cluster $c_i$, the sum distances between it and other clusters are used to measure the semantic typicality.

The semantic bias is ranked in ascending order or descending order, while the compactness is only ranked in ascending order. Then the two orders may be combined to rank all clusters. For example, the two criteria may be combined and a score for cluster $c_i$ may be defined as:

$$s(c_i)_{min} = r(c(c_i)) + \mu * r(t(c_i))_{min}$$

$$s(c_i)_{max} = r(c(c_i)) + \mu * r(t(c_i))_{max}$$

where $r(c(c_i))$ is the ranking position of cluster $c_i$ in terms of compactness in ascending order, $r(t(c_i))_{min}$ or $\mu * r(t(c_i))_{max}$ is the ranking position of cluster $c_i$ in terms of semantic typicality in ascending or descending order, $\mu$ is a weight parameter.

At 114, top-k clusters are selected as the representatives, and the weighted average embedding of their words are used as the representation for that document. For instance, for the document without title, top-k clusters are selected whose scores are k-most minimal and the embedding for the document is computed using Equation 1:

$$E(d) = \sum_{i=1}^{n} \mu_i E(w_i), \text{ and } \mu_i = \frac{N(w_i)}{\sum_{j=1}^{n} n(w_j)}$$

Where n is the number of words in the top-k clusters, $\mu_i$ is the weight of word $w_i$.

At 116, the document is encoded with the computed embedding. For example, one embedding value is assigned to a document.

Based on encoded documents with embeddings, clustering or classification tasks may be performed on a selected document, for example, news, based on their embeddings, and given a test news, its category and/or keywords may be predicted.

The document that is embedded may be stored, for example, transmitted over a computer network and stored as shown at 118. At 120, clustering may be performed on the documents encoded with embedded representation. The method in one embodiment of the present disclosure clusters the documents, whose representations are embeddings, by the k-means method. This clustering finds similar semantic documents or provides a way to determine topics. For example, at 122, classification evaluation may be performed. The process at 122 evaluates classification accuracy. Based on different document representations (embeddings), an algorithm such as k-means clustering may be used to perform clustering on a set of documents and use the result to label documents. The labeled data is separated into a training set and a test set. For instance, 80% of the labeled data or documents may be used as a training set, while 20% of the labeled data or documents are used for a test set, in machine learning. A support vector machine (SVM) classifier may be trained on the training set. The trained classifier predicts the category of any test data. The trained classifier may be implemented as a part of a search engine, for example, for finding a document of a requested category, thereby improving the search engine capability.

At 124, cluster quality evaluation may be performed. For instance, a measurement method such as S_Dbw, a popular clustering validation metric may be computed. The smaller S_Dbw is, the better clusters are. The processing at 124 evaluates the quality of document embeddings learned by a method of the present disclosure in one embodiment. S_Dbw is a method to measure the quality of clusters. If the documents have better embeddings, better clusters will result. A methodology in the present disclosure represents a document as different representations, and compares the S_Dbws computed on them.

Figure 2:
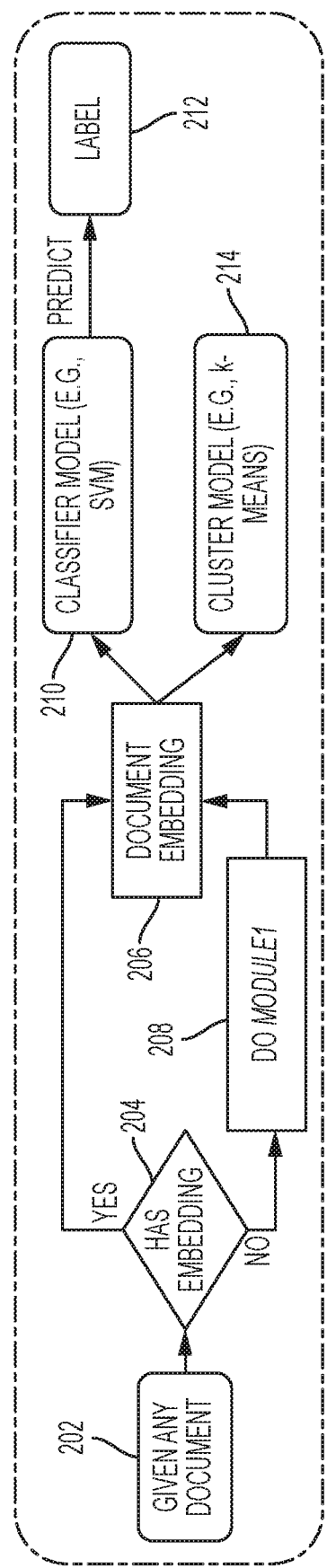
FIG. 2 is a diagram illustrating cluster and classification utilizing the generated document embedding in one embodiment of the present disclosure.

FIG. 2 is a diagram illustrating cluster and classification to predict a label for a given document utilizing the generated document embedding in one embodiment of the present disclosure. For example, after training (e.g., shown in FIG. 1), the method in the present disclosure may execute the trained model (e.g., the SVM classifier) to perform practical predications. Given new documents, the method in one embodiment of the present disclosure can predict their labels (categories), can find their most semantically similar documents, and perform clustering on them to find new topics. At 202, a document is received. At 204, it is determined whether the document is encoded with embedding. For example, the method of the present disclosure saves each trained documents as a key-value pair, where key is the title and value is the embedding. Given a document, the method of the present disclosure in one embodiment first checks whether its title is in the trained corpus, if so, the method can conclude that the document already has an embedding or embedded representation. If the document has embedded representation, the document embedding is performed at 206. For example, if the document already has an embedding, the method may directly get its embedding from the corpus, otherwise the method performs a processing, e.g., described at 126 in FIG. 1. If the document does not have embedding, the embedding shown with reference to FIG. 1 at 126 is performed at 208. Based on the document embedding, a machine trained to predict the label of the document is executed at 210 to predict the label for the given document. For example, an SVM classifier at 210 trained and generated as described with reference to FIG. 1 may be executed. The SVM classifier is executed to predict a label for the given document at 212. At 214, a cluster model, for example, k-means clustering model is generated based on the document embedding at 206. The processing at 214 may perform new clustering on these documents, such that the method may discover or determine new topics. The processing at 214 may also update the SVM classifier, e.g., built at 126 in FIG. 1.

Figure 6:
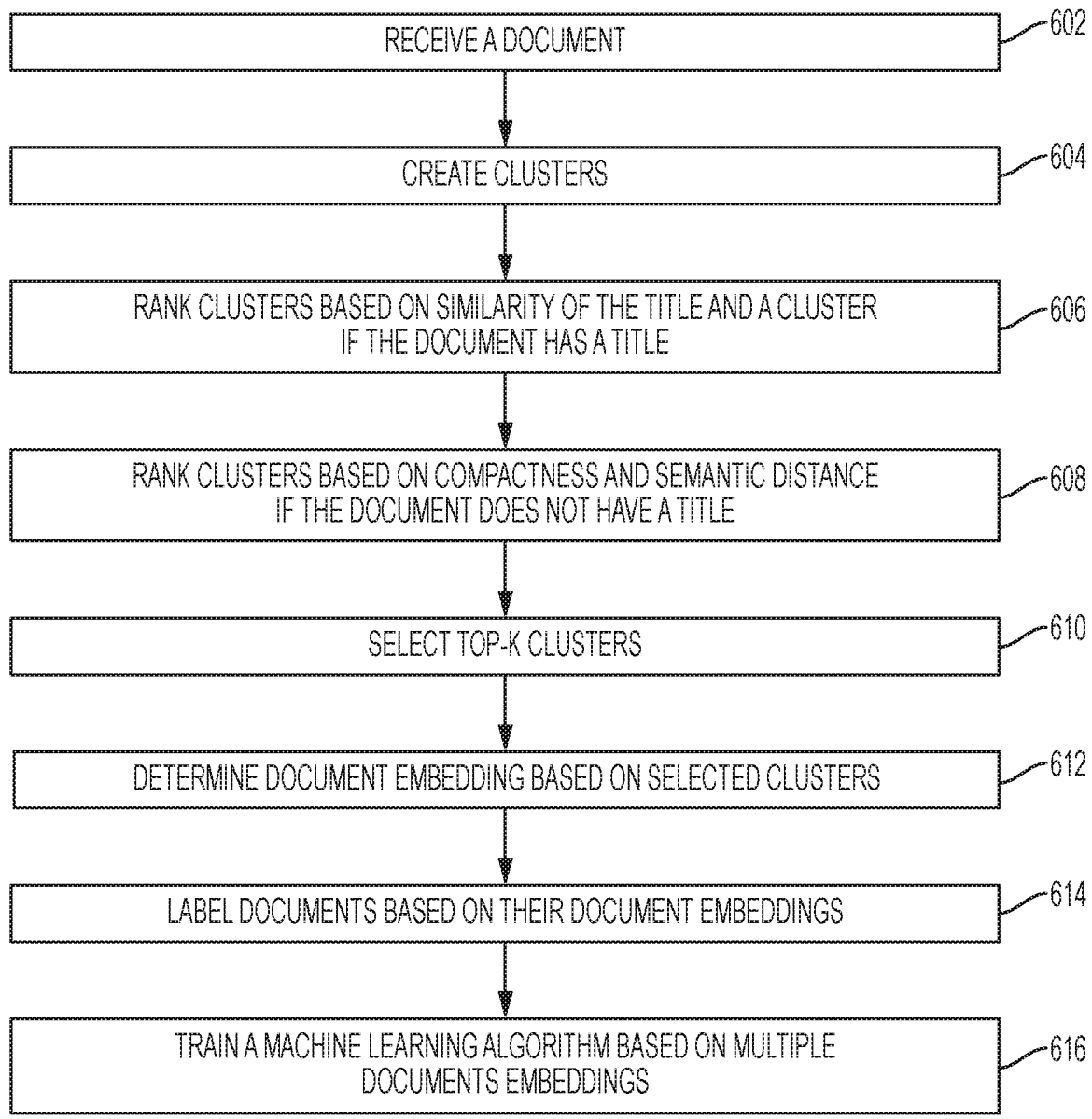
FIG. 6 is a flow diagram illustrating a method in one embodiment of the present disclosure.

FIG. 6 is a flow diagram illustrating a method in one embodiment of the present disclosure. The method includes training a machine to learn to predict a label for data. The method in one embodiment is performed by at least one hardware processor. At 602, a document is received. At 604, clusters of words in the document are created based on cosine similarity of word embeddings of words in the document. For example, dynamic threshold method may be employed. For example, for a given word in the document, a cosine similarity between a word embedding of the given word and the word embeddings of words in an existing cluster may be determined. For instance, the word embeddings of words in a cluster may be summed to represent the cluster, and the cluster's word embedding representation may be compared with the word embedding of the given word. Responsive to determining that the cosine similarity between the word embedding of the given word and the word embeddings of the existing cluster meets a defined threshold, the given word is placed in the existing cluster. Responsive to determining that the cosine similarity between the word embedding of the given word and the word embeddings of the existing cluster does not meet the defined threshold, a new cluster is created and the given word is placed in the new cluster.

At 606, responsive to determining that the document has a title, the clusters are ranked or ordered based on cosine similarity of word embeddings of words in a cluster and word embeddings of words in the title.

At 608, responsive to determining that the document has no title, the clusters are ranked based on compactness of a cluster indicating how closely related the words in the cluster are and a semantic distance of the cluster from other clusters.

At 610, a top-k number of the ranked clusters are selected. The value k may be configurable.

At 612, a document embedding is computed or determined as a weighted sum of word embeddings of words in the top-k number of ranked clusters. The document may be stored with the document embedding.

The receiving at 602, the creating at 604, the ranking at 606 and 608, the selecting at 610, and the determining of the document embedding at 612 may be performed for multiple documents, for example, wherein document embeddings for multiple documents are generated respectively.

At 614, each of the multiple documents may be labeled, for example, by a classification or clustering algorithm.

At 616, a machine learning algorithm is trained based on the multiple documents that are labeled. The training may include separating the multiple documents as a training set and a test set, and generating a machine learning model that predicts a label for a given document based on the training set and the test set. The machine learning model comprises a support vector machine.

Figure 7:
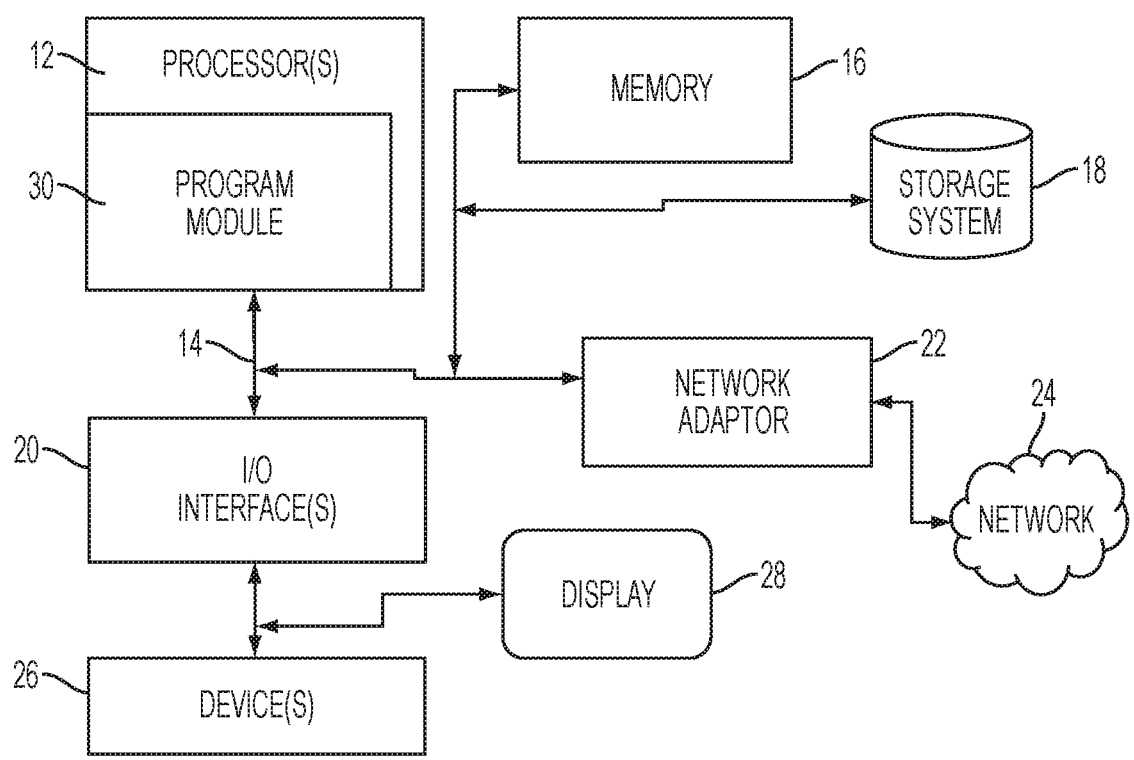
FIG. 7 illustrates a schematic of an example computer or processing system that may implement a system of training a machine to predict a label for a document based on word embedding representations in one embodiment of the present disclosure.

FIG. 7 illustrates a schematic of an example computer or processing system that may implement a system of training a machine to predict a label for a document based on word embeddings in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of training a machine to learn to predict a label for data, the method performed by at least one hardware processor, comprising:
   receiving a document;
   creating clusters of words in the document based on cosine similarity of word embeddings of words in the document;
   responsive to determining that the document has a title, determining a cosine similarity between word embeddings of words in a cluster and word embeddings of words in the title and based on the determined cosine similarity, ranking the clusters;
   responsive to determining that the document has no title, ranking the clusters based on compactness of a cluster indicating how closely related the words in the cluster are and a semantic distance of the cluster from other clusters;
   selecting a top-k number of the ranked clusters;
   determining a document embedding as a weighted sum of word embeddings of words in the top-k number of ranked clusters,
   wherein the receiving, the creating, the ranking, the selecting, and the determining of the document embedding are performed for multiple documents;
   labeling each of the multiple documents; and
   training a machine learning algorithm based on the multiple documents that are labeled, wherein the training comprises separating the multiple documents as a training set and a test set, and generating a machine learning model that predicts a label for a given document based on the training set and the test set.

2. The method of claim 1, wherein the document is stored with the document embedding.

3. The method of claim 1, wherein the machine learning model comprises a support vector machine.

4. The method of claim 1, further comprising:
   receiving a given document to label;
   responsive to determining that the given document does not have a document embedding associated with the given document, generating the document embedding associated with the given document by performing the creating, the ranking, the selecting and the determining on the given document;
   executing the machine learning model based on the document embedding associated with the given document, the machine learning model predicting a label for the given document.

5. The method of claim 1, wherein the ranking the clusters based on cosine similarity of word embeddings of words in a cluster and word embeddings of words in the title, responsive to determining that the document has a title, comprises:
   determining cosine similarity between word embeddings of words in each of the clusters and a sum of word embeddings of words in the title;
   and the selecting comprises selecting the top-k number of clusters determined to be most similar to the title based on the cosine similarity between word embeddings of words in each of the clusters and a sum of word embeddings of words in the title.

6. The method of claim 1, wherein the compactness is measured by a variance of the words in the cluster.

7. The method of claim 1, wherein the creating clusters of words in the document based on cosine similarity of word embeddings of words in the document comprises:
   for a given word in the document, determining a cosine similarity between a word embedding of the given word and the word embeddings of an existing cluster;
   responsive to determining that the cosine similarity between the word embedding of the given word and the word embeddings of the existing cluster meets a defined threshold, placing the given word in the existing cluster; and
   responsive to determining that the cosine similarity between the word embedding of the given word and the word embeddings of the existing cluster does not meet the defined threshold, placing the given word in a new cluster.

8. A computer readable storage medium storing a program of instructions executable by a machine to perform a method of training a machine to learn to predict a label for data, the method performed by at least one hardware processor, the method comprising:

receiving a document;

creating clusters of words in the document based on cosine similarity of word embeddings of words in the document;

responsive to determining that the document has a title, determining a cosine similarity between word embeddings of words in a cluster and word embeddings of words in the title and based on the determined cosine similarity, ranking the clusters;

responsive to determining that the document has no title, ranking the clusters based on compactness of a cluster indicating how closely related the words in the cluster are and a semantic distance of the cluster from other clusters;

selecting a top-k number of the ranked clusters;

determining a document embedding as a weighted sum of word embeddings of words in the top-k number of ranked clusters, wherein the receiving, the creating, the ranking, the selecting, and the determining of the document embedding are performed for multiple documents;

labeling each of the multiple documents; and training a machine learning algorithm based on the multiple documents that are labeled, wherein the training comprises separating the multiple documents as a training set and a test set, and generating a machine learning model that predicts a label for a given document based on the training set and the test set.

9. The computer readable storage medium of claim 8, wherein the document is stored with the document embedding.

10. The computer readable storage medium of claim 8, wherein the machine learning model comprises a support vector machine.

11. The computer readable storage medium of claim 8, further comprising:

receiving a given document to label;

responsive to determining that the given document does not have a document embedding associated with the given document, generating the document embedding associated with the given document by performing the creating, the ranking, the selecting and the determining on the given document;

executing the machine learning model based on the document embedding associated with the given document, the machine learning model predicting a label for the given document.

12. The computer readable storage medium of claim 8, wherein the ranking the clusters based on cosine similarity of word embeddings of words in a cluster and word embeddings of words in the title, responsive to determining that the document has a title, comprises:

determining cosine similarity between word embeddings of words in each of the clusters and a sum of word embeddings of words in the title;

and the selecting comprises selecting the top-k number of clusters determined to be most similar to the title based on the cosine similarity between word embeddings of words in each of the clusters and a sum of word embeddings of words in the title.

13. The computer readable storage medium of claim 8, wherein the compactness is measured by a variance of the words in the cluster.

14. The computer readable storage medium of claim 8, wherein the creating clusters of words in the document based on cosine similarity of word embeddings of words in the document comprises:

for a given word in the document, determining a cosine similarity between a word embedding of the given word and the word embeddings of an existing cluster;

responsive to determining that the cosine similarity between the word embedding of the given word and the word embeddings of the existing cluster meets a defined threshold, placing the given word in the existing cluster; and responsive to determining that the cosine similarity between the word embedding of the given word and the word embeddings of the existing cluster does not meet the defined threshold, placing the given word in a new cluster.

15. A system of training a machine to learn to predict a label for data, comprising:

a storage device; and a hardware processor coupled to the storage device, the hardware processor operable to receive a document;

the hardware processor further operable to create clusters of words in the document based on cosine similarity of word embeddings of words in the document;

the hardware processor further operable to, responsive to determining that the document has a title, determine a cosine similarity between word embeddings of words in a cluster and word embeddings of words in the title and based on the determined cosine similarity, rank the clusters;

the hardware processor further operable to, responsive to determining that the document has no title, rank the clusters based on compactness of a cluster indicating how closely related the words in the cluster are and a semantic distance of the cluster from other clusters;

the hardware processor further operable to select a top-k number of the ranked clusters;

the hardware processor further operable to determine a document embedding as a weighted sum of word embeddings of words in the top-k number of ranked clusters, wherein the hardware processor determines document embeddings for multiple documents and stores the multiple documents with document embeddings in the storage device;

the hardware processor further operable to label each of the multiple documents; and the hardware processor further operable to generate a machine learning model that predicts a label for a given document by training the machine learning model based on the multiple documents separated into the training set and the test set.

16. The system of claim 15, wherein the machine learning model comprises a support vector machine.

17. The system of claim 15, wherein the hardware processor is further operable to receive a given document to label and to execute the machine learning model based on a document embedding associated with the given document, the machine learning model predicting a label for the given document.

18. The system of claim 17, wherein responsive to determining that the given document does not have the associated document embedding, generating the associated document embedding.

19. The system of claim 15, wherein the hardware processor is operable to determine cosine similarity between word embeddings of words in each of the clusters and a sum of word embeddings of words in the title, and operable to select the top-k number of clusters determined to be most similar to the title based on the cosine similarity between word embeddings of words in each of the clusters and a sum of word embeddings of words in the title, for ranking the clusters responsive to determining that the document has a title.

20. The system of claim 15, wherein to create the clusters of words, the hardware processor is operable to:
for a given word in the document,
- determine a cosine similarity between a word embedding of the given word and the word embeddings of an existing cluster;
- responsive to determining that the cosine similarity between the word embedding of the given word and the word embeddings of the existing cluster meets a defined threshold, place the given word in the existing cluster; and
- responsive to determining that the cosine similarity between the word embedding of the given word and the word embeddings of the existing cluster does not meet the defined threshold, place the given word in a new cluster.

* * * * *